(12) United States Patent
Mihelich et al.

(10) Patent No.: US 11,533,617 B2
(45) Date of Patent: Dec. 20, 2022

(54) SECURE LINK AGGREGATION

(71) Applicant: Fortinet, Inc., Sunnyvale, CA (US)

(72) Inventors: Joseph R. Mihelich, Folsom, CA (US); Xiao Hu, San Jose, CA (US); Amit Srivastav, Dublin, CA (US); Norman Cheng, Pleasanton, CA (US)

(73) Assignee: Fortinet, Inc., Sunnyvale, CA (US)

( * ) Notice: Subject to any disclaimer, the term of this patent is extended or adjusted under 35 U.S.C. 154(b) by 261 days.

(21) Appl. No.: 17/039,853

(22) Filed: Sep. 30, 2020

(65) Prior Publication Data

US 2022/0104016 A1    Mar. 31, 2022

(51) Int. Cl.
| | |
|---|---|
| *H04L 29/06* | (2006.01) |
| *H04L 29/08* | (2006.01) |
| *H04W 12/069* | (2021.01) |
| *H04W 76/10* | (2018.01) |
| *H04W 48/16* | (2009.01) |
| *H04W 12/037* | (2021.01) |
| *H04W 80/02* | (2009.01) |

(52) U.S. Cl.
CPC ....... *H04W 12/069* (2021.01); *H04W 12/037* (2021.01); *H04W 48/16* (2013.01); *H04W 76/10* (2018.02); *H04W 80/02* (2013.01)

(58) Field of Classification Search
CPC . H04W 12/069; H04W 76/10; H04W 12/037; H04W 48/16; H04W 80/02
USPC .......................................................... 726/6
See application file for complete search history.

(56) References Cited

U.S. PATENT DOCUMENTS

| | | | |
|---|---|---|---|
| 9,432,255 B1* | 8/2016 | Hasan | H04L 41/0659 |
| 2016/0254956 A1* | 9/2016 | Xu | H04L 41/0886 370/255 |
| 2016/0294632 A1* | 10/2016 | Bhatia | H04L 41/22 |
| 2016/0330080 A1* | 11/2016 | Bhatia | H04L 45/02 |
| 2018/0189005 A1* | 7/2018 | Perez | H04N 1/00854 |
| 2019/0190811 A1* | 6/2019 | Selvaraj | H04L 61/4541 |
| 2019/0230026 A1* | 7/2019 | Jailani | H04L 41/0213 |
| 2020/0313972 A1* | 10/2020 | Kumar | G06N 20/20 |

(Continued)

OTHER PUBLICATIONS

"Securing Data Link Layer With MACSEC", NorthForge Technical Brief, 2017, 5 pages.

(Continued)

*Primary Examiner* — Haresh N Patel
(74) *Attorney, Agent, or Firm* — HDC Intellectual Property Law, LLP

(57) ABSTRACT

Systems and methods are for securing link aggregation are provided. According to an embodiment, a network device in a secure domain discovers device information associated with a peer network device in an untrusted domain that is connected through a first link directly connecting a first interface of the network device to a first interface of the peer network device, and authenticates the peer while allowing at least some network traffic to continue to be transmitted through the first interface. The network device establishes a secure session between the network device and the peer over the first link when the peer network device is successfully authenticated. The network device then allows the first link to operate as part of a single aggregated logical link, including a second link coupling a second interface of the network device to a second interface of the peer network device.

18 Claims, 8 Drawing Sheets

(56) References Cited

U.S. PATENT DOCUMENTS

2020/0358764 A1\* 11/2020 Hojilla Uy ............ H04L 9/0866
2021/0075716 A1\*  3/2021 Hsu ....................... H04L 45/745
2021/0176255 A1\*  6/2021 Hill ....................... H04L 9/3234
2021/0352013 A1\* 11/2021 Devaraj ................. H04L 45/64

OTHER PUBLICATIONS

Aboba, B. et al., "Extensible Authentication Protocol", Network Working Group, Jun. 2004, 67 pages.
Rescorla, E.,et al., "Datagram Transport Layer Security Version 1.2", Internet Engineering Task Force, Jan. 2012, 32 pages.
Krishnan, R., et al., "Mechanisms for Optimizing Link Aggregation Group (LAG) and Equal-Cost Multipath (ECMP) Component Link Utilization in Networks", Internet Engineering Task Force, Jan. 2015, 29 pages.

\* cited by examiner

SECURE LINK AGGREGATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2020, Fortinet, Inc.

BACKGROUND

Field

Embodiments of the present invention generally relate to network security and link aggregation. In particular, embodiments of the present invention relate to link aggregation control protocol (LACP) and verification of peer devices before allowing links to become active within a link aggregation group (LAG).

Description of the Related Art

Link aggregation allows multiple physical links between two end-points to be aggregated together to form a LAG by combining multiple network interfaces into a single logical interface to increase throughput and provide redundancy in case of link failures. A Media Access Control (MAC) client can treat the LAG (which may also be referred to as a virtual link or bundle) as a single logical link. Link aggregation provides network redundancy by load-balancing traffic across all available links. If one of the links fails, the system automatically load-balances traffic across all remaining links.

In networks that support link aggregation, directly-connected network devices that also implement LACP (which may be referred to herein as link peers or simply peers) can automatically aggregate links together based on a set of specific properties negotiated, for example, via LACP.

SUMMARY

Systems and methods are described for securing link aggregation. According to an embodiment, a network device present in a secure domain discovers device information associated with a peer network device present in an untrusted domain that is connected through a first link directly connecting a first interface of the network device to a first interface of the peer network device, and authenticates the peer network device while allowing at least some network traffic to continue to be transmitted through the first interface. The network device establishes a secure session between the network device and the peer network device over the first link coupling the first interface of the network device to the first interface of the peer network device when the peer network device is successfully authenticated. The network device allows the first link to operate as part of a single aggregated logical link, including a second link coupling a second interface of the network device to a second interface of the peer network device.

In an embodiment, the network device may use a Link Layer Discovery Protocol (LLDP) for discovering a peer network device and discover the device information, which includes a hostname of the peer network device, an address of the peer network device, or a capability of the peer network device.

The network device determines whether the peer network device is known to the network device as a result of having a previously validated peering session with the network device via the second link. In an embodiment, the information indicative of the previously validated peering session may be maintained within a database accessible to the network device. In an embodiment, the network device may use a challenge-response authentication mechanism for authenticating the peer device.

In an embodiment, when there is no existing peering session, the network device establishes a Datagram Transport Layer Security (DTLS) connection between the network device and the peer network device via the first link. The network device receives a signed certificate from the peer network device via the DTLS connection and confirms if the signed certificate is from a trusted certificate authority.

Once the peer network device is authenticated, a secure session is established, and the first link is allowed to be aggregated with the second link to form the single aggregated logical link. Other links between the network device and the peer network device may similarly be aggregated if authenticated by challenge-response based authentication or DTLS authentication.

In an embodiment, the network device and the peer network device selectively encrypts packets transmitted on the single aggregated logical link. The selectively encrypted packets include control packets.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1A:
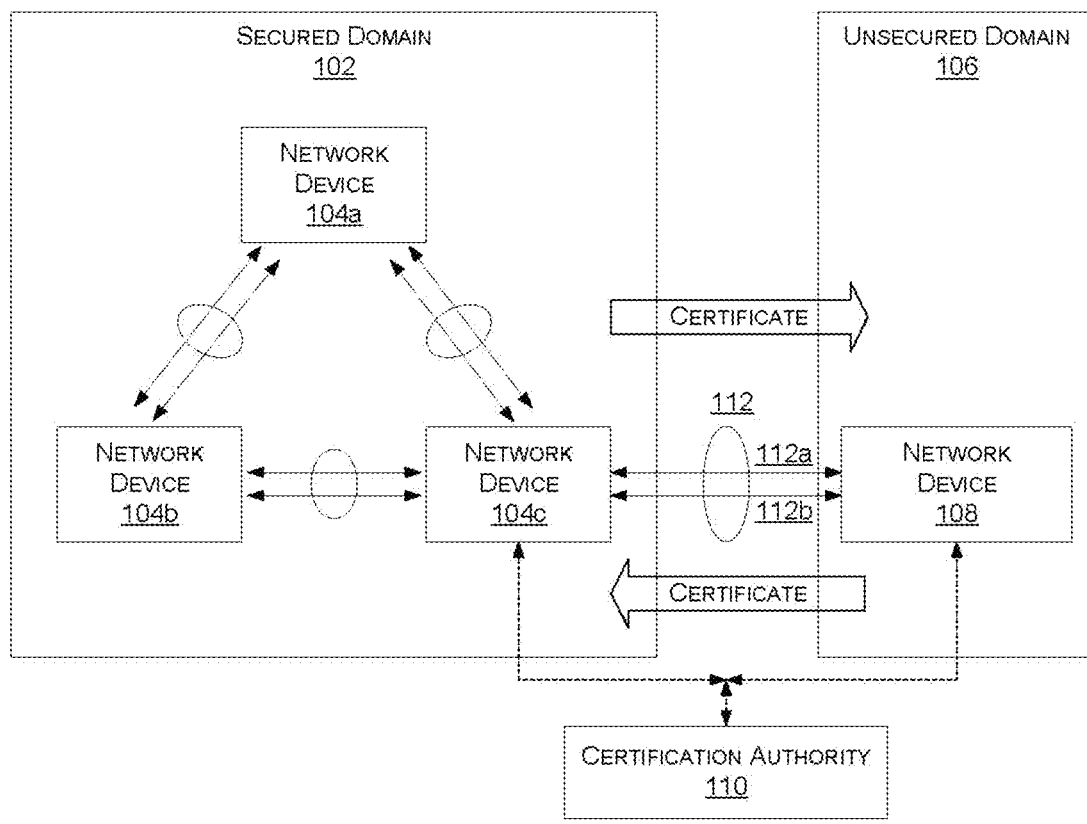
FIG. 1A conceptually illustrates an enterprise network in which link aggregation is performed in accordance with an embodiment of the present disclosure.

Systems and methods are described for securing link aggregation. In embodiments described herein, link aggregation is extended to have a secured mode in which each link within the aggregate authenticates its peer prior to allowing the link to become active within the aggregate. There are several existing methods, such as the Institute of Electrical and Electronics Engineers (IEEE) 802.X.2010 (Port-Based Network Access Control), IEEE 802.1AE (MACsec), and Extensible Authentication Protocol (EAP) that can be used for verifying the identity of the network device before link aggregation between the network device and the secured network device. However, each of these methods has its limitations. For example, some of these approaches require everything transmitted on the link to be encrypted and/or disable the port on which the peer being authenticated until the authentication has been completed. The former cannot be used when one of the network devices is incapable of supporting full wire encryption and the latter may disrupt existing traffic traversing the port.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network device" generally refers to a Layer 2 device or appliance in virtual or physical form. Some network devices may be implemented as general-purpose computers or servers with appropriate software operable to perform Layer 2 functionality. Other network devices may also include custom hardware (e.g., one or more custom Application-Specific Integrated Circuits (ASICs)). appliances). Non-limiting examples of a network device include a Layer 2 switch, a bridge, a Wireless Local Area Network (WLAN) Access Point (AP), and a router.

Figure 1B:
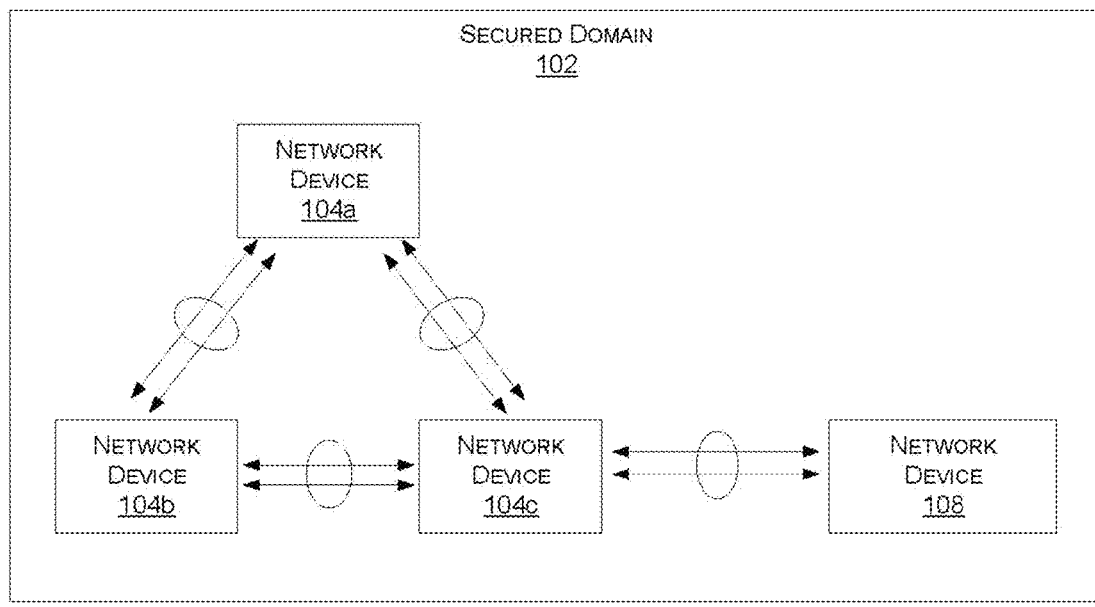
FIG. 1B illustrates a peer device becoming part of a secure domain in accordance with an embodiment of the present disclosure.

FIG. 1A conceptually illustrates an enterprise network 100 in which link aggregation is performed in accordance with an embodiment of the present disclosure. In the context of the present example, the enterprise network 100 is logically divided into a secured domain 102 having network devices 104*a-c* that trust each other and an unsecured domain 106 having network devices, for example, network device 108, that is not trusted by any of the network devices 104*a-c* of the secured domain 102. In the secured domain 102, network devices peer with partners they trust and can communicate safely once the trust is established. Any untrusted device, for example, network device 108 remains in the untrusted domain 106 until authenticated and peered with at-least one network device of the secured domain 102. In order for a peer network device 108 to be connected to the secured domain 102, the network device 108 establishes a trust relationship with its peer by exchanging certificates issued from a trusted certificate authority or certification authority (CA) 110. Once mutual trust is established, the network devices form a single secure fabric domain, as shown in FIG. 1B.

For enabling secure link aggregation between a network device of secured domain 102, and network device 108 (which may also be referred to as peer network device 108) that may be present in unsecured domain 106, each link within the aggregate is authenticated. A link aggregation control protocol (LACP) may use a layer 2 neighbor discovery protocol (e.g., Link Layer Discovery Protocol (LLDP)) to authenticate and establish a secure session with the peer (e.g., network device 104*c* and peer network device 108). Only when the peer, for example, the peer network device 108, is validated, links 112*a-b* between the network device 104c and network device 108 are allowed to become active members of the aggregate 112.

In an embodiment, the network devices 104c may perform initial detection of peer network device 108 via LLDP. LLDP works as the foundation of device detection, peer authentication, and encryption negotiation. The network device 104c may use LLDP to determine whether the peer is known to it. Various authentication approaches may be used individually or in combination as described further below. In one embodiment, a first authentication approach, involving the use of a DTLS session through which both sides may confirm the other has a properly signed certificate from a trusted CA 110, may be used when no validated peering sessions exist between the peers for any links. In one embodiment, when a validating peering session already exists between the peers for at least one link, a second authentication approach, involving a simple challenge-reply based authentication method may be used to confirm the peer has a valid key pair from a trusted CA 110, which may be confirmed by sending a set of data to be signed by the peer. In another embodiment, the simple challenge-reply based authentication method may be used in both scenarios without requiring a full DTLS session. For purposes of aggregating links between the network device 104a and the peer network device 108, a trusted relationship between the network device 104c and the peer network device 108 can be used to establish an initial trust and initiate the link aggregation.

According to one embodiment, responsive to discovery of the peer network device 108 on a first link (e.g., link 112a), the network device 104c may establish a DTLS session with the peer network device 108 via the link 112a and the devices may exchange respective signed certificates via the DTLS session. When the signed certificate received from the peer network device 108 is confirmed to be from a trusted CA 110 (which may also be referred to simply as a CA), an authenticated session may be established between the network device 104c and the peer network device 108 and information regarding the authenticated session may be stored in a local database maintained by the network device 104c. At this point, it is now permissible for link 112a to be made an active member of a LAG. As those skilled in the art will appreciate, a parallel authentication process may also be performed by the peer 108.

In one embodiment, once at least one validated peering sessions exists between the peers for any link (e.g., link 112a), subsequent links with the same peer may be authenticated by performing a simple challenge and response authentication. For example, the network device 104c may consider the peer network device 108 as known when any link (e.g., link 112a) between the network device 104c and the peer network device 108 has a validated peering session (e.g., an encrypted session that may be tracked in a database keyed by the LLDP peer's serial number). In one embodiment, when network device 104c determines there is an existing valid peering session between the network device 104c and the peer network device 108, the network device 104c, then uses the challenge-reply (which may also be referred to herein as challenge-response) based authentication method to validate the peer network device 108.

In an embodiment, the network device 104c may use LLDP for validating the fact that the peer network device is a recognized peer by tunneling the challenge-reply messages or DTLS session within an organizationally specific type length value (TLV) section of the LLDP frame. The TLV may be limited to a maximum of 507 bytes of data per packet, and data may be sent across multiple sequential packets. As no reordering or loss is expected, any loss would result in authentication failure.

The network device 104c may consider the session between the network device 104c and the peer network device 108 as authenticated when a peer network device 108 is verified. The network device 104c may establish an encrypted session with the peer network device 108. Each of the network devices 104a-c may maintain a list of authenticated sessions in a database keyed by the LLDP peer's serial number. According to one embodiment, only one authenticated session per peer is established and maintained in the database and additional links may be added via the challenge-reply mechanism. For example, a second link (e.g., link 112b) between peer devices (e.g., network device 104c and peer network device 108) can be added to the aggregate via a challenge-reply mechanism, if there is an existing session between the peer devices. In an embodiment, a link is considered to be part of the aggregate only after the link is properly authenticated. At this point, LACP begins to encrypt and decrypt LACP packets on the authenticated link. As LACP packets tend to be fairly static, random data may be added to each packet in order to produce constantly changing encryption results. The network devices 104a-c may maintain in their respective databases information regarding DTLS sessions, which may be maintained per peer, for example, based on the peer's serial number. The proposed mechanism can handle multiple switch connections and Multi-Chassis LAG (MC-LAG) topologies.

As noted above, depending upon the particular implementation, a network device (e.g., network device 104c) may use other peer validation mechanisms. In one embodiment, the network device 104c, instead of using a full DTLS session for purposes of performing peer authentication, may use a simple challenge and reply method for validating a peer network device 108. For example, the network device 104c may send a set of data to be signed by the peer network device 108 and use the signed data along with the public signing certificate to verify that the peer network device has a valid key pair from the trusted CA 110. Once authenticated, the links 112a-b between the network device 104c and the network device 108 can be aggregated, and network traffic exchanged therebetween can be selectively transmitted in encrypted form. For example, all traffic sent on the links may be encrypted or encryption may be limited to control packets. On a system in which full wire encryption is infeasible, not possible, or simply not desired, the peers may encrypt only particular types of packets (e.g., control traffic (Spanning Tree Protocol (STP), LACP, Open Shortest Path First (OSPF), etc.), user traffic, packets associated with a particular protocol, etc.)

In an embodiment, the peer network device 108 remains in an unauthenticated state if it fails the challenge-reply based authentication, and may be periodically re-challenged. When the challenge-reply authentication is completed, the network device 104c may consider the peer network device 108 as a trusted peer.

In an embodiment, a network device 104c present in a secure domain 102 may discover device information associated with a peer network device 108 having a first link (e.g., link 112a) directly connecting a first interface of the network device 104c to a first interface of the peer network device 108, and authenticate the peer network device 108 before aggregating the first link with a second link (e.g., link 112b) to form a single aggregated link 112. The peer network device 108, until authenticated, is considered to be part of an unsecured domain 106. Non-limiting examples of discovered device information may include a hostname, an address, a serial number, or a capability of the peer network device. The network device 104c may use a layer 2 neighbor discovery protocol (e.g., LLDP) for discovery of the peer and its device information.

In an embodiment, the network device 104c may authenticate the peer network device 108 while allowing at least some network traffic to continue to be transmitted through the first interface. The network device 104c establishes a secure session between the network device 104c and the peer network device 108 over the first link coupling the first interface of the network device 104c to the first interface of the peer network device 108 when the peer network device 108 is successfully authenticated and allows the first link to operate as part of a single aggregated logical link including a second link 112b coupling a second interface of the network device to a second interface of the peer network device.

The network device 104c may determine whether the peer network device 108 is known to the network device 104c as a result of having a previously validated peering session with the peer network device 108 via the second link 112b. In an embodiment, the information indicative of the previously validated peering session may be maintained within a database accessible to the network device. In an embodiment, due to the existing peering session with the peer network device 108, the network device may use a simple challenge-response authentication mechanism for authenticating the peer device. In an embodiment, after all links (e.g., links 112a-b) between the network device 104c and the peer network device 108 have been validated and made active members of a single aggregated logical link (e.g., LAG 112), the devices may selectively encrypt packets transmitted via the single aggregated logical link.

FIG. 1B illustrates a peer device 108 becoming part of a secure domain in accordance with an embodiment of the present disclosure. The peer network device 108 becomes part of secured domain 102 once the peer network device 108 is authenticated and the links between the network device 104c and the peer network device 108 are aggregated and secured.

Figure 2:
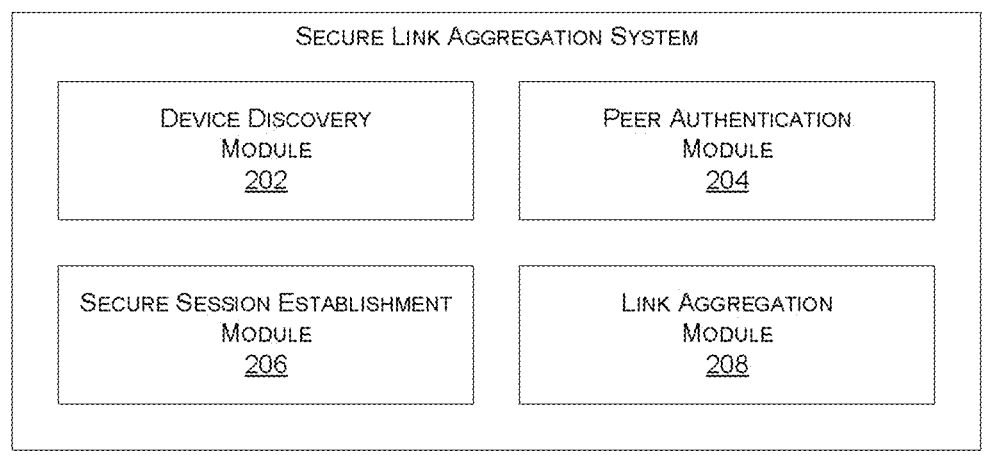
FIG. 2 illustrates the functional modules of a secure link aggregation system in accordance with an embodiment of the present disclosure.

FIG. 2 illustrates the functional modules of a secure link aggregation system 200 in accordance with an embodiment of the present disclosure. The system 200 may be implemented within a network device (e.g., network device 104, 108, 302, 304, and/or 502) and includes a device discovery module 202 operable to discover by a processing resource of a network device within a secure domain, device information associated with a peer network device in an untrusted domain. The device discovery module 202 may use LLDP to discover the peer network device, where the first interface of the network device is directly connected to the first interface of the peer network device. The system 200 includes a peer authentication module 204 operable to authenticate the peer network device while allowing at least some network traffic to continue to be transmitted through the first interface, and a secure session establishment module 206 operable to establish a secure session between the network device and the peer network device over a first link coupling the first interface of the network device to the first interface of the peer network device when the peer network device is successfully authenticated. The system 200 further includes a link aggregation module 208 configured to allow the first link to operate as part of a single aggregated logical link, including a second link coupling a second interface of the network device to a second interface of the peer network device.

In an embodiment, the peer authentication module 204 at the network device may use LLDP for authenticating a peer network device. The peer authentication module 204 at the network device checks the existence of an established session between the network device and the peer network device by referring to a database storing information regarding existing authenticated sessions. For example, a secure ink aggregation system 200 may store a serial number of a peer network devices with which it has an established secure session. In some embodiments, the peer authentication module 204 determines whether the peer network device is known to the network device by checking the existence of a validated peering session. When an existing peering session between the network device and the peer network device is found in the database, the peer network device is considered to be authenticated. In the absence of a peering session between the network device and the peer network device or when a predefined time duration has lapsed for the existing peering session, module 204 may make use of a DTLS session with the peer network device to perform peer authentication.

Once the peer network device is validated, the secure session establishment module 206 facilitates the negotiation of an encryption mechanism between the network device and the peer network device and creates the secure session between the network device and the peer network device.

The link aggregation module 208 is operable to aggregate a link between the network device and the peer network device with one or more other links between the network device and the peer network device to form a LAG. For each discovered link between the network device and the peer network device, the system 200 may check if there is an existing peer relationship between the network device and the peer network device. If there an existing peer relationship, module 208 may perform a challenge-response based authentication for such subsequent links, and in response to successful completion of the challenge-response based authentication allow the newly authorized link to be aggregated into the LAG. In an embodiment, where there is no existing peer relationship between the network device and the peer network device, the system 200 may establish a DTLS session with the peer network device to perform peer authentication, for example, by exchanging and validating respective signed certificates via the DTLS session as described above.

Once the link has been authenticated, the LACP begins to recognize the first link as a valid member of the link aggregation group. At this point, LACP may begin to encrypt all LACP packet on the authenticated link. As LACP packets are supposed to be fairly static, random data may be added to each packet in order to produce a constantly changing encryption result. In an embodiment, the system 200 maintains a DTLS session per peer, which allows the handling of multiple switch connections and MC-LAG topologies. When the network device or peer network device receives invalid data, LACP may keep the member down and may not treat the link between the network device and the peer network device as secure. When a DTLS session is re-keyed, one side may have a new key, while the other side may still have an old key, this situation can be addressed by DTLS via its maximum segment lifetime (MSL), which may be assigned to each authenticated session.

In an embodiment, system 200 enables link aggregation between a secured network device of a secured fabric domain and a network device present outside the secured fabric domain. The system discovers the presence of a peer network device in an untrusted domain using Link Layer Discovery Protocol (LLDP), authenticates a peer relationship between a network device and the peer network device, establishes a secure session between the network device and the peer network device based on the authentication result, and enables aggregation of one or more links between the network device and the peer network device if the secure session between the secured network device and the network device is established.

Figure 3:
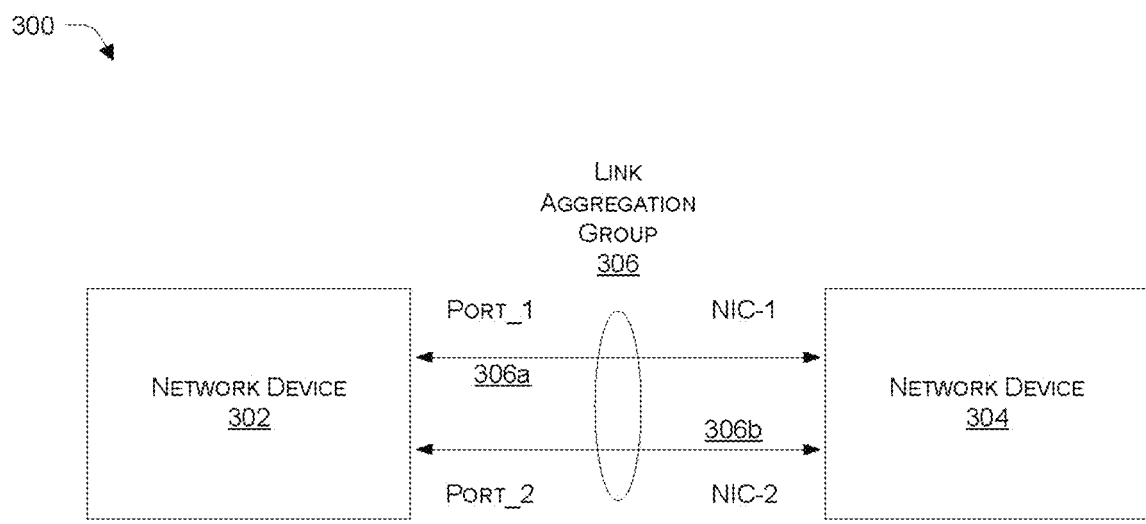
FIG. 3 is a block diagram illustrating link aggregation in accordance with an embodiment of the present disclosure.

FIG. 3 is a block diagram illustrating link aggregation in accordance with an embodiment of the present disclosure. In an embodiment, a link aggregation group (LAG) 306 can be created by aggregating existing links between two network devices, for example, between network device 302 and network device 304. A link 306a connecting a first interface (e.g., Port_1) of network device 302 with a first interface (e.g., NIC-1) of the network device 304 may be aggregated to be part of the LAG 306 based on a peer authentication process involving the use of a DTLS session or a challenge-response authentication approach. For example, the link 306a may allowed to be aggregated based on the challenge-response authentication approach when there is an existing peering relation between the network device 302 and the network device 304 via another link (e.g., link 306b). As shown in FIG. 3, if an existing peering session has previously been established via the link 306b, the link 306a can be easily aggregated using the challenge-response authentication. In this manner, secure link aggregation allows combining multiple network connections in parallel between two mutually authenticated network devices to increase throughput beyond what a single connection could sustain, and provides redundancy in case one of the links fails.

Figure 4:
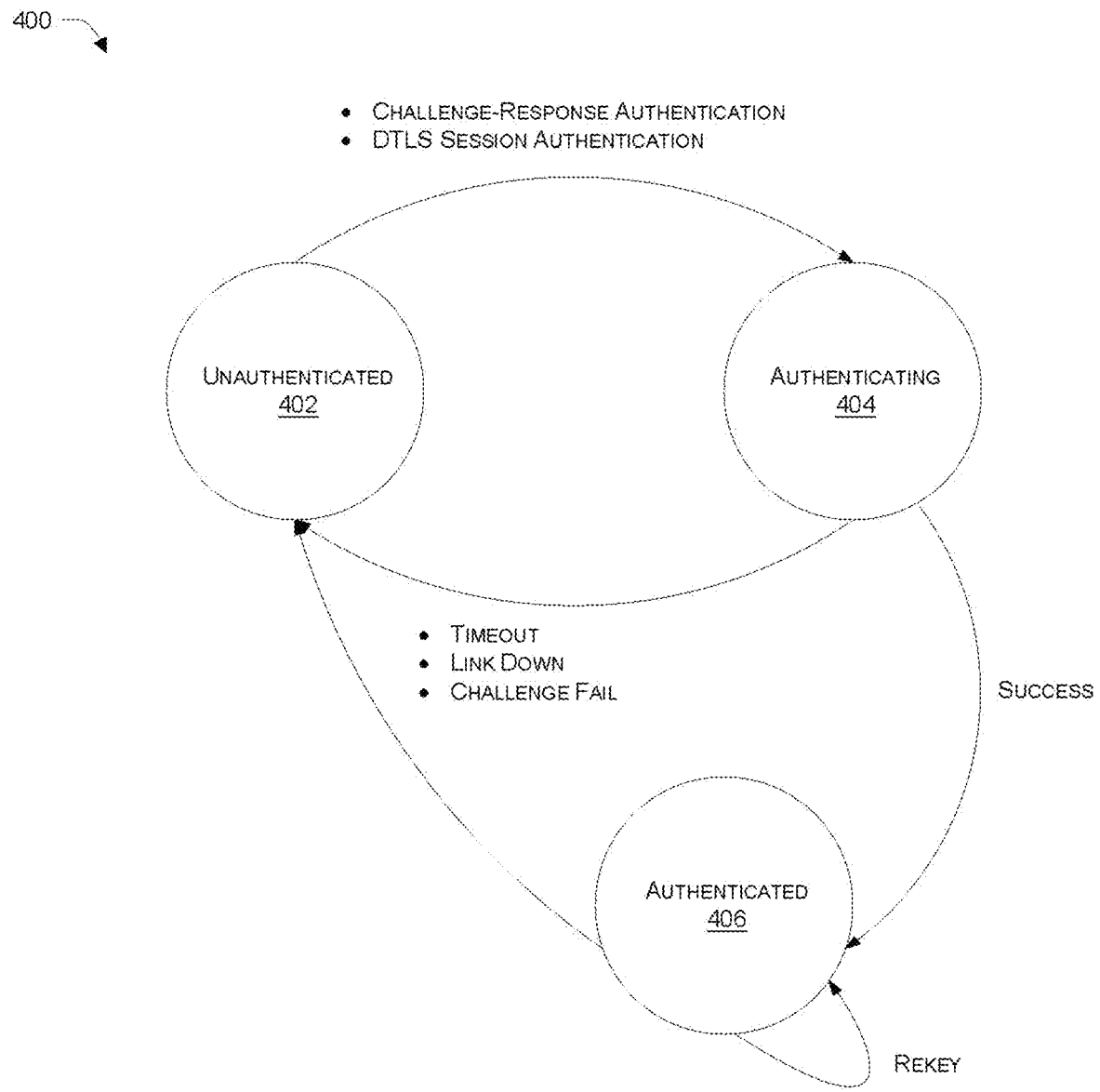
FIG. 4 is a state diagram illustrating various states of a peer network device maintained by a local network device in accordance with an embodiment of the present disclosure.

FIG. 4 is a state diagram 400 illustrating various states of a peer network device maintained by a local network device in accordance with an embodiment of the present disclosure. Depending upon the particular implementation, the local network device (e.g., network device 104c) within a secure fabric domain may maintain a state machine for each direct link (e.g., links 112a-b) between the local network device and each peer network device (e.g., network device 108). Alternatively, the local network device may maintain a single state machine for each peer network device to reflect a current state of a session with the peer network device.

In the context of the present example, responsive to discovery of the peer network device on a link at issue (e.g., link 112a) by the local network device, the local network device may consider the link state to be in an unauthenticated state 402.

According to one embodiment, in a scenario in which there is no existing peering session between the local network device and the peer network device (e.g., there are no links between the peer network device and the local network device that are in an authenticated state 406), peer authentication for the link at issue is attempted through a DTLS session and the link state transitions to an authenticating state 404. While the peer authentication is in process, the link state remains in the authenticating state 404. In contrast to other link aggregation approaches, in one embodiment, the local network device may continue to send and receive some traffic via interfaces associated with links on which a peer network device is being authenticated. That is, interfaces remain active and are not disabled during peer authentication processing. Advantageously, this mitigates potential disruption of existing traffic traversing the interfaces.

As discussed above, in an embodiment, if the local network device identifies an existing peering session with the peer network device through another link (e.g., link 112b), the network device may forego making use of a full DTLS session for performing peer authentication for the link at issue and may instead use a simple challenge-response based authentication approach.

When a timeout occurs, the link at issue is down, and/or the peer network device fails the challenge-response based authentication for the link at issue, the link state may transition back to the unauthenticated state 402 and the peer network device may be periodically re-challenged.

Responsive to successful authentication of the peer network device by the local network device, the link state transitions to an authenticated state 406. In an embodiment, the peers are periodically rekeyed and the link states remains in the authenticated state 406. In one embodiment, after at least one link state of a set of direct links between the local network device and the peer network device is in the authenticated state 406, each subsequent link between the local network device and the peer network device can be added via the challenge-response based authentication approach.

In the context of the present example, the link state transitions from the authenticated state 406 back to the unauthenticated state 402 after the expiration of a preconfigured timeout period and/or when the link goes down.

Figure 5:
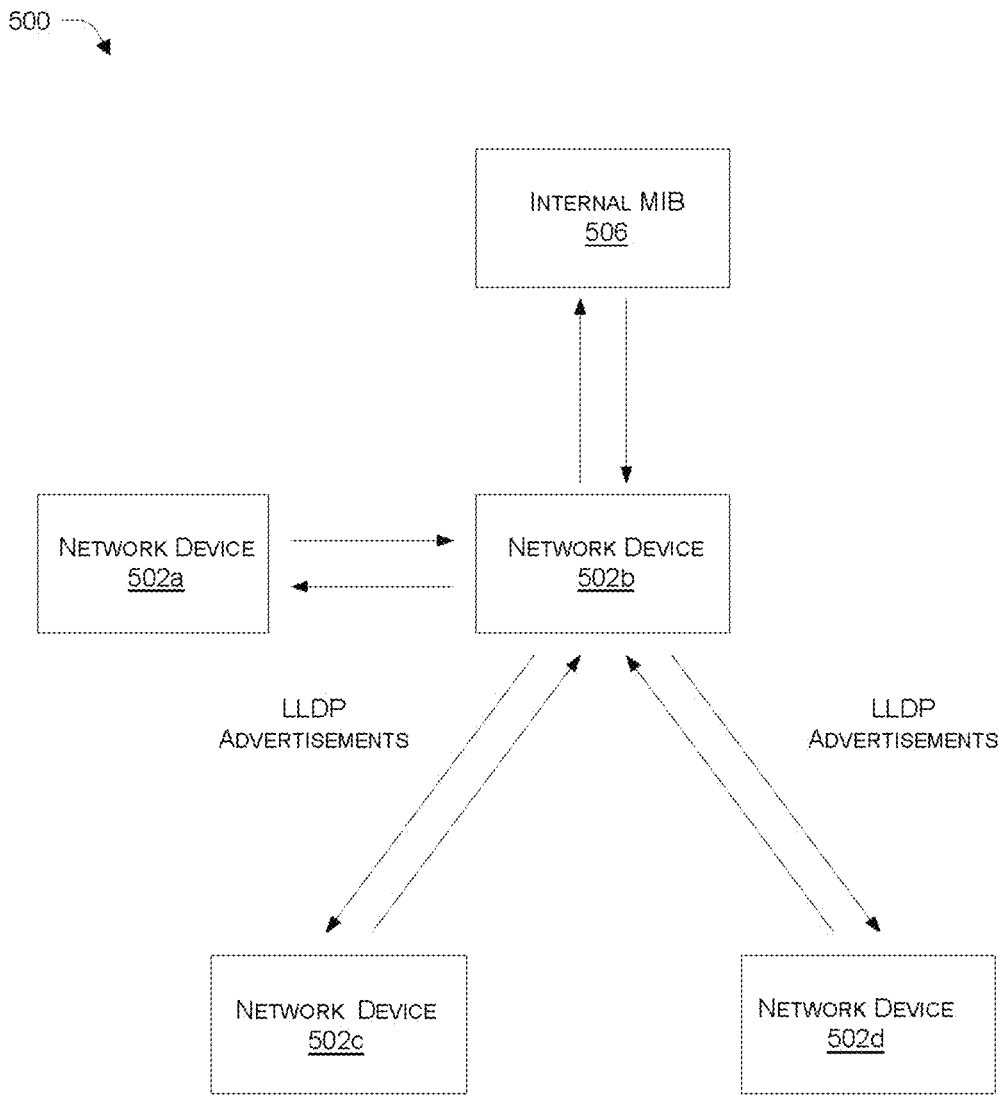
FIG. 5 is a block diagram illustrating device discovery in accordance with an embodiment of the present disclosure.

FIG. 5 is a block diagram 500 illustrating device discovery in accordance with an embodiment of the present disclosure. In the context of the present example, LLDP is enabled appropriate interfaces/ports of network devices 502a-d to facilitate discovery of each other and collection of device information. Non-limiting examples of device information include a hostname, an address (e.g., an Media Access Control (MAC) address), a serial number and one or more capabilities (e.g., supported system capabilities (the primary function of the device, for example, a bridge, WLAN AP, or router), enabled system capabilities, port speed capabilities, aggregation capability, etc.) of a network device.

Network devices 502a-b send LLDP advertisements to each other advertising their respective device information via each of their respective LLDP-enabled interfaces and the recipient network devices store the received device information in respective management information base (MIB) databases (e.g., internal MIB 506). While only one internal MIB 506 is shown it is to be appreciated that each network device 502a-d may have an associated internal MIB. In an embodiment, the internal MIB 506 may include a local system MIB (not shown) and a remote system MIB (not shown). The local system MIB may store device information for the local device (the device's own information) and the remote system MIB may store device information gathered via LLDP advertisements received from the peer network devices. Responsive to discovering a peer network device on a particular link a network device may authenticate the peer network device using the authentication mechanism suggested below.

The various modules described herein (e.g., modules 202, 204, 206, and 208) and the processing described below with reference to the flow diagrams of FIG. 6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 7 below.

Figure 6:
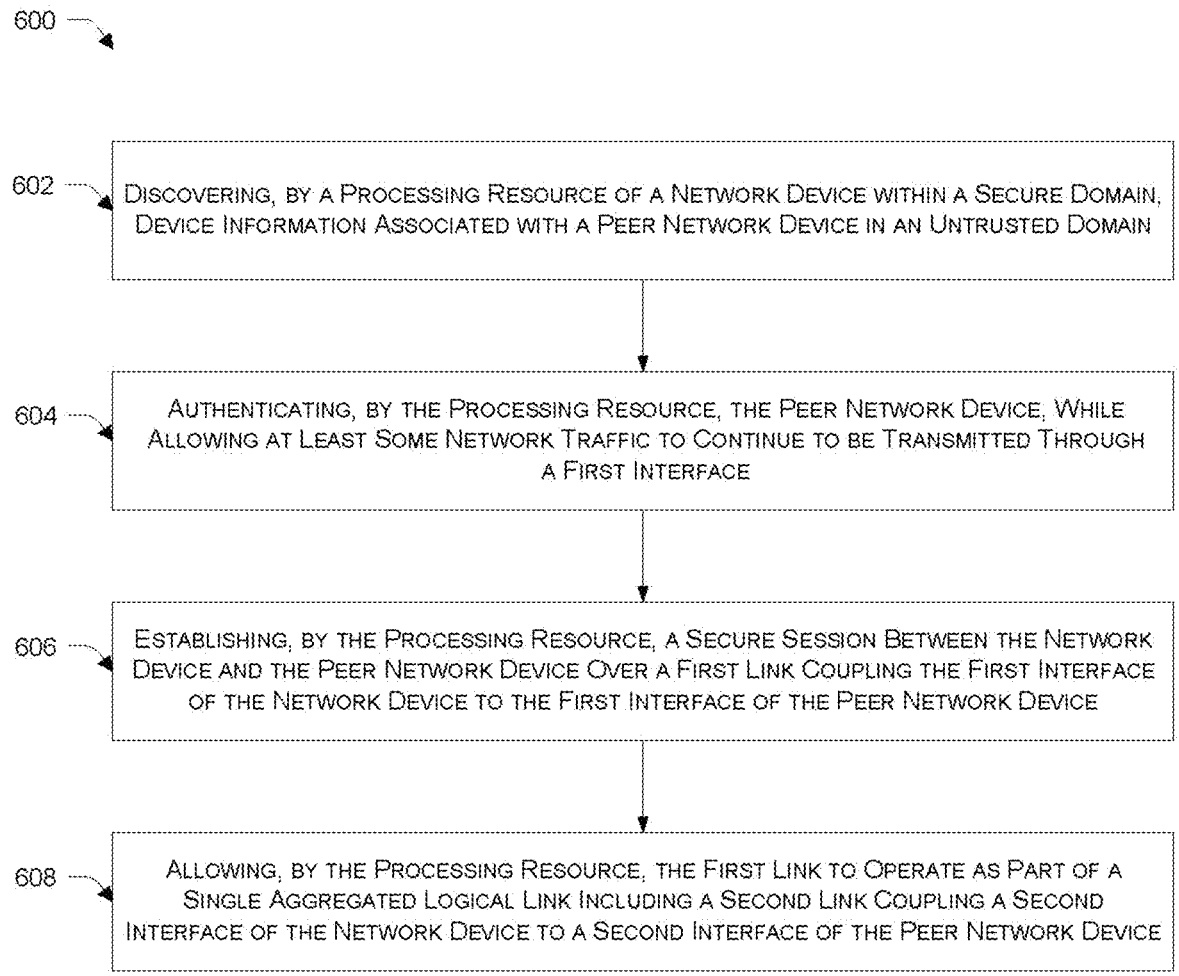
FIG. 6 is a flow diagram illustrating secure link aggregation processing in accordance with an embodiment of the present disclosure.

FIG. 6 is a flow diagram illustrating secure link aggregation processing in accordance with an embodiment of the present disclosure. At block 602, a processing resource of a network device (e.g., network device 104c) within a secure domain discovers device information associated with a peer network device (e.g., peer network device 108) in an untrusted domain. According to one embodiment, this discovery process involves receipt of a layer 2 neighbor discovery protocol message (e.g., an LLDP advertisement) from the peer network device on a first link (e.g., link 112a) directly coupling a first interface of the network device with a first interface of the peer network device. The layer 2 neighbor discover protocol may include device information (e.g., a host name, an address, and a serial number) of the peer network device. The device information may be stored within a local MIB (e.g., internal MIB 506) associated with the network device.

At block 604, the processing resource authenticates the peer network device while allowing at least some network traffic to continue to be transmitted through the first interface. Depending upon the particular implementation, one or more authentication approaches may be used individually or in combination. A first peer authentication approach may involve the use of a DTLS session in which the network device confirms the peer network device has a properly signed certificate from a trusted CA (e.g., CA 110). A second peer authentication approach may involve a simple challenge-reply based authentication approach to confirm the peer network device has a valid key pair from the trusted CA, which may be confirmed by sending a set of data to be signed by the peer network device. In one embodiment, the first peer authentication approach is used when no validated peering sessions exist between the network device and the peer network device for any direct links therebetween and the second peer authentication approach is used, when a validated peering session already exists between the peers for at least one link. In an alternative embodiment, the first peer authentication approach may be used regardless of the existence of a validated peering session. In yet another alternative embodiment, the second peer authentication approach may be used regardless of the existence of a validated peering session.

At block 606, the processing resource establishes a secure session between the network device and the peer network device over the first link. According to one embodiment, LACP begins to encrypt and decrypt all LACP packets on the authenticated link. Information regarding the authenticated session (also referred to herein as the validating peering session) may be stored in a database maintained by the network device. For example, a single DTLS session may be maintained per peer and keyed by the LLDP peer's serial number. According to another embodiment, encryption may be selectively performed based on one or more criteria (e.g., a type of packet, a protocol associated with the packet, etc.).

At block 608, the processing resource allows the first link to operate as part of a single aggregated logical link (e.g., LAG 112) including a second link (e.g., link 112b) coupling a second interface of the network device to a second interface of the peer network device. According to one embodiment, the network device marks the first link as an active member of the LAG.

In this manner, once the LAG is created, network traffic, including data packets and control packets, can be selectively transmitted in encrypted form using a negotiated encryption mechanism between the network device and peer network device. In scenarios, for example, in which full wire encryption is not feasible, particular types of packets (e.g., control traffic (STP, LACP, OSPF, etc.) vs. user traffic) may be selectively encrypted. Additionally, the approach described herein can be extended to protect other legacy protocols that do not natively support encryption.

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 7:
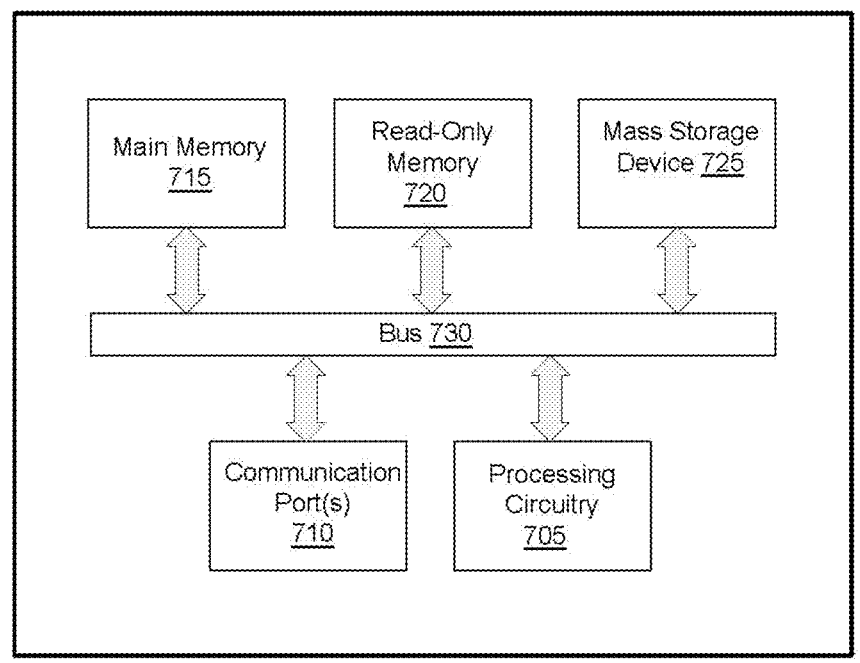
FIG. 7 illustrates an exemplary computer system in which or with which embodiments of the present invention may be utilized.

FIG. 7 illustrates an exemplary computer system in which or with which embodiments of the present invention may be utilized. As shown in FIG. 7, a computer system includes an external storage device 740, a bus 730, a main memory 715, a read-only memory 720, a mass storage device 725, a communication port 710, and one or more processing resources (e.g., processing circuitry 705). Computer system 700 may represent some portion of a network device (e.g., network device 104, 108, 302, 304, and/or 502).

Those skilled in the art will appreciate that computer system 700 may include more than one processor and communication ports 710. Examples of processing circuitry 705 include, but are not limited to, an Intel® Itanium® or Itanium 2 processor(s), or AMD® Opteron® or Athlon MP® processor(s), Motorola® lines of processors, FortiSOC™ system on chip processors or other future processors. Processing circuitry 705 may include various modules associated with embodiments of the present invention.

Communication port 710 can be any of an RS-232 port for use with a modem-based dialup connection, a 10/100 Ethernet port, a Gigabit or 10 Gigabit port using copper or fiber, a serial port, a parallel port, or other existing or future ports. Communication port 710 may be chosen depending on a network, such as a Local Area Network (LAN), Wide Area Network (WAN), or any network to which the computer system connects.

Memory 715 can be Random Access Memory (RAM), or any other dynamic storage device commonly known in the art. Read-Only Memory 720 can be any static storage device(s) e.g., but not limited to, a Programmable Read-Only Memory (PROM) chips for storing static information e.g. start-up or BIOS instructions for processing circuitry 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 730 communicatively couples processing circuitry 705 with the other memory, storage, and communication blocks. Bus 730 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing circuitry 705 to a software system. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Their respective functions may be carried out through the operation of program logic, through dedicated logic, through the interaction of program control and dedicated logic. Those of ordinary skill in the art further understand that the exemplary hardware, software, processes, methods, and/or operating systems described herein are for illustrative purposes and, thus, are not intended to be limited to any explicitly called out herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   discovering via a layer 2 neighbor discovery protocol, by a processing resource of a network device within a secure domain, device information associated with a peer network device in an untrusted domain, wherein a first interface of the network device is directly connected to a first interface of the peer network device;
   while allowing at least some network traffic to continue to be transmitted through the first interface, authenticating, by the processing resource, the peer network device;
   when the peer network device is successfully authenticated, establishing, by the processing resource, a secure session between the network device and the peer network device over a first link coupling the first interface of the network device to the first interface of the peer network device; and
   allowing, by the processing resource, the first link to operate as part of a single aggregated logical link including a second link coupling a second interface of the network device to a second interface of the peer network device.

2. The method of claim 1, wherein the layer 2 neighbor discovery protocol comprises Link Layer Discovery Protocol (LLDP).

3. The method of claim 1, wherein the device information includes a hostname of the peer network device, an address of the peer network device, or a capability of the peer network device.

4. The method of claim 1, wherein said authenticating comprises:
   establishing, by the processing resource, a Datagram Transport Layer Security (DTLS) connection between the network device and the peer network device via the first link;
   receiving, by the processing resource, a signed certificate from the peer network device via the DTLS connection; and
   confirming, by the processing resource, the signed certificate is from a trusted certificate authority.

5. The method of claim 1, wherein said authenticating comprises determining whether the peer network device is known to the network device as a result of having a previously validated peering session with the network device via the second link.

6. The method of claim 5, wherein information indicative of the previously validated peering session is maintained within a database of the network device.

7. The method of claim 1, wherein said authenticating comprises subjecting the peer network device to a challenge-response authentication mechanism.

8. The method of claim 1, further comprising selectively encrypting, by the processing resource, packets transmitted on the single aggregated logical link.

9. The method of claim 8, wherein said selectively encrypting, by the processing resource, packets transmitted on the single aggregated logical link comprises encrypting control traffic and not encrypting user traffic.

10. A network device comprising:
   a processing resource; and
   a non-transitory computer-readable medium, coupled to the processing resource, having stored therein instructions that when executed by the processing resource cause the processing resource to:
   discover via a layer 2 neighbor discovery protocol device information associated with a peer network device in an untrusted domain, wherein a first interface of the network device is directly connected to a first interface of the peer network device;
   while allowing at least some network traffic to continue to be transmitted through the first interface, authenticate the peer network device;

when the peer network device is successfully authenticated, establish a secure session between the network device and the peer network device over a first link coupling the first interface of the network device to the first interface of the peer network device; and allow the first link to operate as part of a single aggregated logical link including a second link coupling a second interface of the network device to a second interface of the peer network device.

11. The network device of claim 10, wherein the layer 2 neighbor discovery protocol comprises Link Layer Discovery Protocol (LLDP).

12. The network device of claim 10, wherein the device information includes a hostname of the peer network device, an address of the peer network device, or a capability of the peer network device.

13. The network device of claim 10, wherein the peer network device is authenticated by:

establishing a Datagram Transport Layer Security (DTLS) connection between the network device and the peer network device via the first link;

receiving a signed certificate from the peer network device via the DTLS connection; and confirming the signed certificate is from a trusted certificate authority.

14. The network device of claim 10, wherein the peer network device is authenticated by determining whether the peer network device is known to the network device as a result of having a previously validated peering session with the network device via the second link.

15. The network device of claim 14, wherein information indicative of the previously validated peering session is maintained within a database of the network device.

16. The network device of claim 10, wherein the peer network device is authenticated by subjecting the peer network device to a challenge-response authentication mechanism.

17. The network device of claim 10, wherein the instructions further cause the processing resource to selectively encrypt packets transmitted on the single aggregated logical link.

18. The network device of claim 17, wherein selective encryption of the packets involves encrypting control traffic and not encrypting user traffic.

* * * * *